US006180256B1

(12) United States Patent
Sargeant

(10) Patent No.: US 6,180,256 B1
(45) Date of Patent: Jan. 30, 2001

(54) HEAT SHRINKABLE INK JET RECORDING MEDIUM

(75) Inventor: Steven J. Sargeant, West Warwick, RI (US)

(73) Assignee: Arkwright Incorporated, Fiskeville, RI (US)

( * ) Notice: Under 35 U.S.C. 154(b), the term of this patent shall be extended for 0 days.

(21) Appl. No.: 09/137,337

(22) Filed: Aug. 20, 1998

Related U.S. Application Data

(60) Provisional application No. 60/056,390, filed on Aug. 26, 1997, now abandoned.

(51) Int. Cl.[7] ..................... B32B 27/00

(52) U.S. Cl. ..................... 428/500; 428/212; 428/195; 427/372.2; 427/385.5

(58) Field of Search ..................... 428/195, 211, 428/212, 325, 327, 328, 329, 330, 331, 476.6, 500, 520, 522, 532

(56) References Cited

U.S. PATENT DOCUMENTS

| | | | | |
|---|---|---|---|---|
| 4,461,793 | | 7/1984 | Lyubov et al. . | |
| 5,700,582 | * | 12/1997 | Sargeant et al. | 420/476.6 |
| 5,714,245 | * | 2/1998 | Atherton et al. | 428/323 |

FOREIGN PATENT DOCUMENTS

| | | |
|---|---|---|
| 1805890 | 5/1969 | (DE) . |
| 1805892 | 5/1969 | (DE) . |
| 60-228191 | 11/1985 | (JP) . |

* cited by examiner

*Primary Examiner*—Bruce H. Hess
*Assistant Examiner*—Michael E. Grendzynski
(74) *Attorney, Agent, or Firm*—Birch, Stewart, Kolasch & Birch, LLP

(57) ABSTRACT

A heat shrinkable ink jet recording medium is provided for ink jet printing applications. In a preferred embodiment, the invention provides a polystyrene base substrate coated with an ink jet ink receptive coating layer that contains a flexible resin and an adhesion promoter. A method for preparing an article with the medium is also provided.

17 Claims, No Drawings

HEAT SHRINKABLE INK JET RECORDING MEDIUM

The present application claims priority based on U.S. provisional application Ser. No. 60/056,390, filed Aug. 26, 1997, now abandoned.

FIELD OF THE INVENTION

The present invention relates to a heat shrinkable ink jet recording medium and a method for preparing the medium. The present invention further relates to a method for preparing an article using the heat shrinkable ink jet recording medium.

BACKGROUND OF THE INVENTION

There are many applications of consumer desktop printing in which consumers use ink jet printing. The low cost, high speed and full color output associated with desktop ink jet printing make such methods valuable for the production of brochures, reports, cards, stickers, photos and various other products. However, the inability of desktop ink jet printer feed mechanisms to accommodate thick substrates limits the media selection to those generally less than 10 mils thick. However, there are many ink jet printing applications for printed media greater than 10 mils thick. Often, these applications are accomplished by transfer printing. U.S. Pat. No. 5,148,196 to Spector discloses a system for converting a printable sheet of heat-shrinkable, synthetic plastic film material into a custom-made miniature of a selected individual, using a video camera and television monitor to transfer an image of the individual to an associated printer which impresses the image on the film in a scale appropriate to its dimensions. The film sheet is then shrunk by heating to produce a miniature.

SUMMARY OF THE INVENTION

The present invention provides a heat shrinkable ink jet recording medium, and a method for preparing the medium, that can be shrunk after printing to construct many useful articles, such as toys, jewelry, ornaments, art pieces, etc., which articles are not possible or desirable to construct from a transfer process. An ink jet printer is used to print the articles onto the medium using original designs created with commercially available software, images selected from clip-art or down-loaded from the Internet, scanned photographs, etc.

The present inventive heat shrinkable ink jet recording medium comprises a heat shrinkable base substrate and a heat shrinkable ink jet ink receptive coating layer applied to a printable surface of the base substrate, wherein the base substrate and the ink jet ink receptive coating layer are shrinkable in uniform proportion in all directions. The base substrate is polystyrene or biaxially oriented polypropylene. The ink jet ink receptive coating layer comprises (1) a flexible resin having a glass transition temperature lower than that of the substrate to which the coating is applied and a water absorptivity of greater than 50% by weight, and (2) an adhesion promoter that is a graft copolymer of hydroxyethyl methacrylate and methyl methacrylate.

DETAILED DESCRIPTION OF THE INVENTION

The present invention provides a heat shrinkable ink jet recording medium comprising a heat shrinkable base substrate and a heat shrinkable ink jet ink receptive coating layer applied to a printable surface of the base substrate. The base substrate and ink jet ink receptive coating layer are shrinkable in uniform proportions in all directions, and are shrinkable after printing to produce the article of the present invention. In the present inventive medium, the substrate is preferably in the form of a sheet of a shrinkable material such as polystyrene or biaxially oriented polypropylene. More preferably, the base substrate is shrinkable in a "x" dimensional direction in an amount of up to about 61% and is shrinkable in a "y" dimensional direction in an amount of up to about 41% after heating the base substrate at about 120° C. for about five minutes, and wherein the "x" dimensional direction and the "y" dimensional direction are perpendicular to each other and are in a plane formed by the base substrate. Concurrent with its shrinking in the "x" and "y" dimensional direction, is an expansion of the base substrate in a "z" dimensional direction that is perpendicular to the plane formed by the base substrate. That is, upon heating the base substrate it not only shrinks in both the "x" and "y" dimensional directions, but also expands in a "z" dimensional direction to become both dimensionally smaller (in the "x" and "y" dimensional directions) and thicker (in the "z" dimensional direction).

The ink jet ink receptive coating used to prepare the present inventive medium preferably comprises (1) a flexible resin having a glass transition temperature lower than that of the substrate to which the coating is applied and a water absorptivity of greater than 50% by weight, and (2) an adhesion promoter that is a graft copolymer of hydroxyethyl methacrylate and methyl methacrylate.

When in the instant invention, the substrate selected is polystyrene, suitable flexible resins that can be used in the ink jet ink receptive coating layer include poly(2-ethyl-2-oxazoline), poly(ethylene oxide), poly(tetrahydrofuran), poly(1,3-dioxolane), and poly(vinylmethylether), each of which have a glass transition temperature of less than that of polystyrene (i.e., about 100° C.).

The adhesion promoter used to prepare the ink jet ink receptive coating layer of the present invention is preferably a graft copolymer wherein hydroxyethyl methacrylate is grafted on a backbone of methyl methacrylate.

While not being bound by any theory of how the instant invention works, the present inventor believes that when polystyrene, or another suitably shrinkable substrate material, is used as a substrate in the inventive medium, it swells in the presence of solvents used in the inventor's coating solutions, such that the adhesion promoter can attach to the swelled surface of the substrate and remain attached thereto when the solvent is removed by drying.

The purpose of the flexible resin in the ink jet ink receptive coating is to prevent cracking of the ink jet coating layer when the coated shrinkable substrate is later shrunk. Thus, the flexible resin used in the inventive media should not be a resin that cracks or crazes under strain. Also, the chosen flexible resin should possess a glass transition temperature lower than that of the substrate to which the ink jet ink receptive coating is applied, and should possess a water absorptivity of greater than 50% by weight in order to ensure adequate ink absorptivity for the produced ink jet ink recording medium.

The heat shrinkable ink jet recording medium of the present invention is prepared by producing the ink jet ink receptive coating as described herein, applying the coating to a surface of a heat shrinkable base substrate, and drying the coated base substrate to produce the shrinkable ink jet recording medium. The coating can be applied using any suitable means including but not limited to roller coating, extrusion coating, wire-bar coating, dip-coating, rod coating, doctor coating, or gravure coating. Such techniques are well known in the art. The coating layer is applied to the base substrate in an amount of from about 4 to about 25 grams per square meter (g/$m^2$). The coated substrate is dried in an oven at a temperature of about 100° C. for about 1 minute.

An article is produced with the prepared heat shrinkable ink jet recording medium of the present invention by printing a desired image on the medium with an ink jet printer and heating the printed at a sufficient temperature and for a sufficient time to cause the heat shrinkable ink jet recording medium to heat shrink and thereby form said article by shrinkage of the recording medium in both "x" and "y" dimensional directions, and expansion thereof in a "z" dimensional direction, as previously described herein. A typically suitable temperature and time for heating a printed medium of the present invention to thereby form an article of the present invention is, for example, about 120° C. for about 5 minutes. This is true, for example, when the base substrate is a sheet of a shrinkable material such as polystyrene or biaxially oriented polypropylene.

The following examples are provided in an effort to aid those desiring to practice the instant invention. These examples are in no way to be construed as limited to the present inventive discovery, as set forth in the claims attached hereto, including the equivalents thereof. In the following examples, the term "parts" means parts by weight.

EXAMPLE 1

| Material | Parts |
|---|---|
| (1) Poly(2-ethyl-2-oxazoline)[1] | 80 |
| (2) Graft copolymer of HEMA and MMA[2] | 20 |
| (3) Dowanol PM[3] | 200 |
| (4) Methanol | 200 |

[1]Aquazol AI produced by Polymer Chemistry Innovations.
[2]L-20 Manufactured by Soken (grafted copolymer).
[3]Propylene glycol monomethyl ether manufactured by Dow Chemical Co.

The above materials are combined to prepare an ink jet ink receptive coating that is coated onto a polystyrene substrate (such as polystyrene manufactured by Plastic Materials) using a Number 36 wire wound bar. The coated substrate is dried in an oven at 100° C. for 1 minute.

EXAMPLE 2

| Material | Parts |
|---|---|
| (1) Poly(2-ethyl-2-oxazoline)[1] | 70 |
| (2) Graft copolymer of HEMA and MMA[2] | 30 |
| (3) Dowanol PM[3] | 200 |
| (4) Methanol | 200 |

[1]Aquazol AI produced by Polymer Chemistry Innovations.
[2]L-20 Manufactured by Soken (grafted copolymer).
[3]Propylene glycol monomethyl ether manufactured by Dow Chemical Co.

The above materials are combined to prepare an ink jet ink receptive coating that is coated onto a polystyrene substrate (such as polystyrene manufactured by Plastic Materials) using a Number 36 wire wound bar. The coated substrate is dried in an oven at 100° C. for 1 minute.

EXAMPLE 3

| Material | Parts |
|---|---|
| (1) Poly(2-ethyl-2-oxazoline)[1] | 75 |
| (2) Graft copolymer of HEMA and MMA[2] | 25 |
| (3) Isopropyl alcohol | 200 |
| (4) PMMA[3] | 1 |

[1]Aquazol AI produced by Polymer Chemistry Innovations.
[2]L-20 Manufactured by Soken (grafted copolymer).
[3]Polymethylmethacrylate beads (Soken).

The above materials are combined to prepare an ink jet ink receptive coating that is coated onto a polystyrene substrate (such as polystyrene manufactured by Plastic Materials) using a Number 36 wire wound bar. The coated substrate is dried in an oven at 100° C. for 1 minute.

COMPARATIVE EXAMPLE 4

| Material | Parts |
|---|---|
| (1) Poly(2-ethyl-2-oxazoline)[1] | 80 |
| (2) Copolymer of HEMA and MMA[2] | 20 |
| (3) Dowanol PM[3] | 200 |
| (4) Methanol | 200 |

[1]Aquazol AI produced by Polymer Chemistry Innovations.
[2]SP-7 Manufactured by Soken (non-grafted straight chain copolymer).
[3]Propylene glycol monomethyl ether manufactured by Dow Chemical Co.

The above materials are combined to prepare an ink jet ink receptive coating that is coated onto a polystyrene substrate (such as polystyrene manufactured by Plastic Materials) using a Number 36 wire wound bar. The coated substrate is dried in an oven at 100° C. for 1 minute.

COMPARATIVE EXAMPLE 5

| Material | Parts |
|---|---|
| (1) Polyvinylpyrrolidone[1] | 80 |
| (2) Graft Copolymer of HEMA and MMA[2] | 20 |
| (3) Dowanol PM[3] | 200 |
| (4) Methanol | 200 |

[1]PVP K-90 Manufactured by International Specialty Products.
[2]L-20 SP-7 Manufactured by Soken (grafted copolymer).
[3]Propylene glycol monomethyl ether manufactured by Dow Chemical Co.

The above materials are combined to prepare an ink jet ink receptive coating that is coated onto a polystyrene substrate (such as polystyrene manufactured by Plastic Materials) using a Number 36 wire wound bar. The coated substrate is dried in an oven at 100° C. for 1 minute.

The following Table is provided to show adhesion, shrink adhesion, and shrink curl results achieved with one of the heat shrinkable ink jet recording media of the present invention (Example 1) and with Comparative Examples 4 and 5, that are outside the scope of the present invention.

TABLE

| | Adhesion | Shrink Adhesion | Shrink Curl |
|---|---|---|---|
| Example 1 | Pass | Pass | Pass |
| Comparative Example 4 | Fail | Fail | Pass |
| Comparative Example 5 | Pass | Pass | Fail |

Adhesion was measured by cross-hatching the coated sample and trying to peel off the coating with tape. A value of pass means no coating came off. A value of fail means some coating was removed as noted by visual inspection.

Shrink adhesion was tested by cross-hatching the coated sample which was previously processed at 120° C. for five minutes in a forced air oven. This condition causes the polystyrene base sheet to contract or shrink in the "x" and "y" directions, but increase in thickness in the "z" direction, as described previously herein. A value of pass means no coating came off. A value of fail means some coating was removed as noted by visual inspection.

Shrink curl was tested by placing a 4" by 4" coated film in an oven on a flat surface. The film was heated for 5 minutes at 100° C. The edge height curl measured from each edge was recorded. If this curl was greater than 2 mm, a value of fail was noted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat shrinkable ink jet recording medium comprising a heat shrinkable base substrate and a heat shrinkable ink jet receptive coating layer applied to a surface of the base substrate, said coating layer comprising a flexible resin having a glass transition temperature less than about 100° C. selected from the group consisting of poly(2-ethyl-2-oxazoline), poly(ethylene oxide), poly(tetrahydrofuran), poly(1,3-dioxolone) and poly(vinylmethylether), and wherein the base substrate and ink jet receptive coating layer are shrinkable in uniform proportion in all directions.

2. The heat shrinkable ink jet recording medium according to claim 1, wherein the base substrate of the ink jet recording medium is shrinkable in a "x" dimensional direction in an amount of up to about 61% and is shrinkable in a "y" dimensional direction in an amount of up to about 41% after heating the base substrate at about 120° C. for about five minutes, and wherein the "x" dimensional direction and the "y" dimensional direction are perpendicular to each other and are in a plane formed by the base substrate.

3. The heat shrinkable ink jet recording medium according to claim 1, wherein the base substrate is selected from the group consisting of polystyrene and biaxially oriented polypropylene.

4. The heat shrinkable ink jet recording medium according to claim 1, wherein the flexible resin has a water absorptivity of greater than about 50% by weight.

5. The heat shrinkable ink jet recording medium according to claim 1, wherein the ink jet receptive coating layer further comprises an adhesion promoter.

6. The heat shrinkable ink jet recording medium according to claim 5, wherein the adhesion promoter comprises a graft copolymer of hydroxyethyl methacrylate and methyl methacrylate.

7. A heat shrinkable ink jet recording medium comprising a heat shrinkable polystyrene base substrate and a heat shrinkable ink jet ink receptive coating layer applied to a surface of the base substrate, the ink jet ink receptive coating layer comprising poly(2-ethyl-2-oxazoline) having a glass transition temperature less than about 100° C. and a graft copolymer of hydroxyethyl methacrylate and methyl methacrylate, wherein the base substrate and ink jet ink receptive coating layer are shrinkable in uniform proportion.

8. The heat shrinkable ink jet recording medium according to claim 7, wherein the base substrate of the ink jet recording medium is shrinkable in a "x" dimensional direction in an amount of up to about 61% and is shrinkable in a "y" dimensional direction in an amount of up to about 41% after heating the base substrate at about 120° C. for about five minutes, and wherein the "x" dimensional direction and the "y" dimensional direction are perpendicular to each other and are in a plane formed by the base substrate.

9. The heat shrinkable ink jet recording medium according to claim 8, wherein the ink jet ink receptive coating layer comprises about 80 parts by weight poly(2-ethyl-2-oxazoline) and about 20 parts by weight of a graft copolymer of hydroxyethyl methacrylate and methyl methacrylate.

10. The heat shrinkable ink jet recording medium according to claim 9, wherein the coating layer is applied to the base substrate in an amount of from about 4 grams per square meter to about 25 grams per square meter.

11. A method for preparing a heat shrinkable ink jet recording medium comprising:

(a) preparing or obtaining a heat shrinkable ink jet receptive coating layer;

(b) applying the heat shrinkable ink jet receptive coating layer to a surface of a heat shrinkable base substrate; and (c) drying the coated substrate; and wherein:

the base substrate of the ink jet recording medium is shrinkable in a "X" dimensional direction in an amount of up to about 61% and is shrinkable in a "y" dimensional direction in an amount of up to about 41% after heating the base substrate at about 120° C. for about five minutes, and wherein the "x" dimensional direction and the "y" dimensional direction are perpendicular to each other and are in a plane formed by the base substrate; the ink jet receptive coating layer comprises a flexible resin having a glass transition temperature that is less than about 100° C. and the glass transition temperature of the base substrate, and which ink jet receptive coating layer is selected from the group consisting of poly (2-ethyl-2-oxazoline), poly(ethylene oxide), poly (tetrahydrofuran), poly(1,3-dioxolone) and poly (vinylmethylether); and after drying the coated substrate, the base substrate and the ink jet receptive coating layer are shrinkable in uniform proportion in all directions.

12. The method according to claim 11, wherein the ink jet receptive coating layer further comprises an adhesion promotor that is a graft copolymer of hydroxyethyl methacrylate and methyl methacrylate.

13. The method according to claim 11, wherein the base substrate is selected from the group consisting of polystyrene and biaxially oriented polypropylene.

14. The method according to claim 13, wherein the ink jet receptive coating layer is applied to the base substrate in an amount of from about 4 grams per square meter to about 25 grams per square meter.

15. The method according to claim 14, wherein the coated substrate is dried in an oven at about 100° C. for about 1 minute.

16. An article prepared from a heat shrinkable ink jet recording medium according to claim 1, which article is prepared by a process comprising the sequential steps of:

(a) printing an image on the ink jet receptive coating layer of said heat shrinkable ink jet recording medium with an ink jet printer; and (b) heating the heat shrinkable ink jet recording medium at a sufficient temperature and for a sufficient time to cause the heat shrinkable ink jet recording medium to heat shrink.

17. The article according to claim 16, wherein in step (b) the heat shrinkable ink jet recording medium is heated at about 120° C. for about 5 minutes to cause the heat shrinkable ink jet recording medium to heat shrink and thereby form said article.

* * * * *